United States Patent
Ugiansky

(10) Patent No.: US 8,210,912 B2
(45) Date of Patent: Jul. 3, 2012

(54) GAME WINCH SYSTEMS AND METHODS

(76) Inventor: Bobby D. Ugiansky, Austin, TX (US)

(*) Notice: Subject to any disclaimer, the term of this patent is extended or adjusted under 35 U.S.C. 154(b) by 0 days.

(21) Appl. No.: 13/158,835

(22) Filed: Jun. 13, 2011

(65) Prior Publication Data

US 2011/0312259 A1  Dec. 22, 2011

Related U.S. Application Data

(60) Provisional application No. 61/397,769, filed on Jun. 16, 2010.

(51) Int. Cl.
*A22B 1/00* (2006.01)
(52) U.S. Cl. .......................................... 452/187
(58) Field of Classification Search .................. 452/125, 452/127–130, 185, 187–192, 198; 414/462, 414/539–543; 212/179, 180, 294, 299; 254/325, 254/283, 284, 335; 224/321, 521, 518
See application file for complete search history.

(56) References Cited

U.S. PATENT DOCUMENTS

| | | | | |
|---|---|---|---|---|
| 5,494,117 A * | 2/1996 | Aldridge | ......................... | 173/28 |
| 5,873,776 A * | 2/1999 | Klepac | .......................... | 452/191 |
| 6,089,431 A * | 7/2000 | Heyworth | ...................... | 224/521 |
| 6,250,483 B1 * | 6/2001 | Frommer | ...................... | 212/180 |
| 6,499,610 B2 * | 12/2002 | Spitsbergen | .................. | 212/179 |
| 6,921,007 B1 * | 7/2005 | Guerrant | ...................... | 224/519 |
| 7,485,032 B1 * | 2/2009 | Hogue | .......................... | 452/187 |
| 7,544,032 B1 * | 6/2009 | Scott, Jr. | ...................... | 414/462 |
| 7,625,269 B2 * | 12/2009 | Godwin | ........................ | 452/129 |
| 7,845,622 B1 * | 12/2010 | Riggs | ............................ | 254/326 |
| 7,852,211 B2 * | 12/2010 | Gunn et al. | .................. | 340/541 |
| 7,931,524 B2 * | 4/2011 | Mckenzie | ..................... | 452/187 |

* cited by examiner

*Primary Examiner* — Richard Price, Jr.

(74) *Attorney, Agent, or Firm* — Law Offices of Mark L. Berrier

(57) ABSTRACT

Systems and methods for suspending game animals. One embodiment is a system that includes a hitch fitting, a boom, a first winch and a stabilizer. The hitch fitting is configured to fit within a hitch receiver of a vehicle. The boom is coupled to the hitch fitting and extends upward from the hitch fitting. The first winch is coupled to an upper end of the boom and is configured to raise and suspend a game animal from the upper end of the boom. The stabilizer is coupled to the lower end of the boom and is configured to stabilize a lower end of the game animal which is suspended from the upper end of the boom.

18 Claims, 5 Drawing Sheets

GAME WINCH SYSTEMS AND METHODS

CROSS-REFERENCE TO RELATED APPLICATIONS

This application claims the benefit of U.S. Provisional Patent Application 61/397,769, filed Jun. 16, 2010, which is incorporated by reference as if set forth herein in its entirety.

BACKGROUND

1. Field of the Invention

The invention relates generally to hunting, and more particularly to systems and methods for raising and stabilizing the carcass of a game animal to facilitate field dressing of the animal.

2. Related Art

Many people enjoy hunting game animals such as deer, elk, wild boars and the like. As hunters are well aware, hunting involves more than merely tracking and killing an animal. Once the animal has been killed, it must be retrieved and carried out of the hunt area. Typically, the animal is also field dressed near the site of the kill in order to help preserve its meat.

Field dressing is the process of removing the internal organs of the game animal. Many hunters prefer to have the animal raised above the ground when field dressing the animal. Often, hunters are forced to resort to throwing a rope over a tree limb and using the rope to raise and suspend the animal. In this case, it is usually necessary to have one person hold the animal and keep it from swinging while another person field dresses the animal.

More recently, hitch-mounted booms have been developed. This type of boom extends upward from the trailer hitch of a truck and may include a winch that allows the hunter to raise the animal and so spend it from the boom. It is still necessary, however, to have one person steady the animal while another person field dresses the animal.

SUMMARY OF THE INVENTION

This disclosure is directed to systems and methods that solve one or more of the problems discussed above. In one particular embodiment, a system for suspending a game animal includes a hitch fitting, a boom, a first winch and a stabilizer. The hitch fitting is configured to fit within a hitch receiver of a vehicle. The boom is coupled to the hitch fitting and extends upward from the hitch fitting. The first winch is coupled to an upper end of the boom and is configured to raise and suspend a game animal from the upper end of the boom. The stabilizer is coupled to the lower end of the boom and is configured to stabilize a lower end of the game animal which is suspended from the upper end of the boom.

The boom may have an upper portion and a lower portion, wherein the upper portion pivots on the lower portion and is configured to be alternately secured in multiple positions. The system may include a light source which is positioned at the upper end of the boom and is configured to illuminate an area in which the game animal is suspended. A connector may be provided to couple the light source to the vehicle's electrical system through a connection installed with the hitch receiver. The system may include a wheel on the upper portion of the boom, so that when the upper portion is in the stowed position, the wheel is positioned at the bottom of the system to support the system and enable it to be transported and maneuvered into position for mounting in the hitch receiver. Attachment points may be provided on the boom to allow stabilizing lines to be attached between the boom and the vehicle on which it is mounted, thereby securing the boom.

The stabilizer may be movably connected to the lower end of the boom, so that it can be placed alternately in a storage position in which the stabilizer is substantially parallel to the lower end of the boom, or a working position in which the stabilizer extends substantially perpendicular from the lower end of the boom. In one embodiment, the stabilizer includes two opposing pins, each of which is configured to be placed through a corresponding leg of the game animal to secure the animal. The stabilizer may be adjustable to position the two pins at a variable distance from each other. It should also be noted that the stabilizer arms include non-slip surfaces so that, when the stabilizer is in the working position, a user can stand on the stabilizer arms in order to allow him to reach higher. This also allows the boom to be higher than in conventional devices, which makes it more useful for larger animals.

The system may include a second winch coupled to the lower end of the boom and a skinning attachment which is connected to the second winch. When the skinning attachment is secured to the hide of the game animal, tightening the second winch pulls the skinning attachment downward, thereby pulling the hide from the game animal. The skinning attachment may include a body portion having multiple hooks attached to it and a handle to enable a user to grasp the skinning attachment and fasten the hooks to the hide of the game animal.

The system may include a gambrel which is connected to the first winch. The gambrel is configured to secure two of the legs of the game animal to the first winch, so that when the first winch is tightened, the gambrel raises the game animal toward the upper end of the boom. The gambrel may have an automatically spreading design which includes a vertical member and two lateral members. An upper end of the vertical member is connected to the first winch. The two lateral members are pivotally connected to the lower end of the vertical member. When the game animal is secured to the gambrel, the weight of the animal causes the lateral members and the legs of the game animal to move outward from the vertical member.

An alternative embodiment may comprise a method for suspending a game animal for field dressing. The method may include providing a game winch system as described above, securing an upper end of the game animal to the first winch, raising the upper end of the game animal with the first winch, and securing a lower end of the game animal to the stabilizer, thereby preventing the game animal from swinging.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
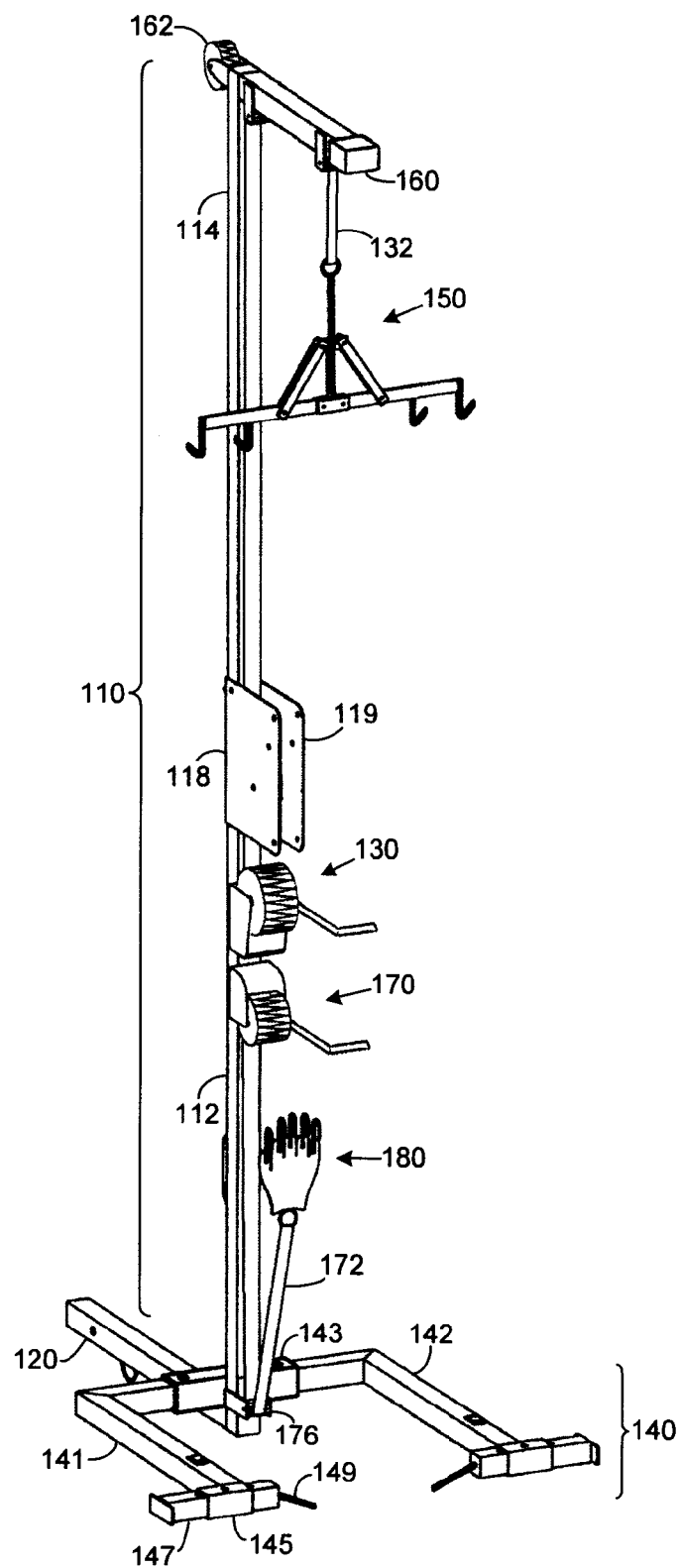
FIG. 1 is a perspective view of an exemplary game winch in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for raising and stabilizing game animals using a game winch system. The system allows a game animal that has been killed to be conveniently raised and stabilized by a single person so that the animal can be field dressed.

Figure 2:
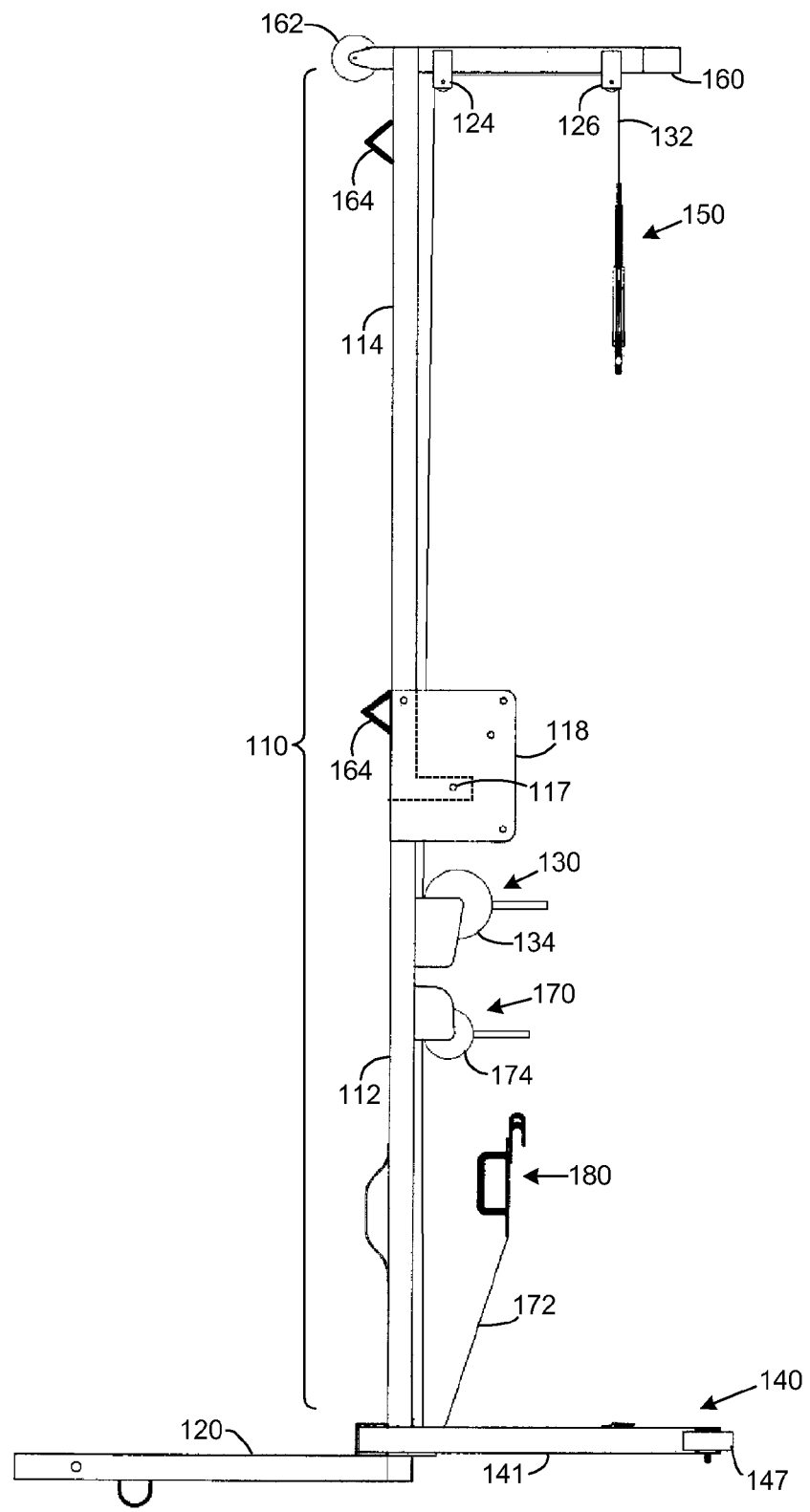
FIG. 2 is a side view of an exemplary game winch in accordance with one embodiment.
Figure 3:
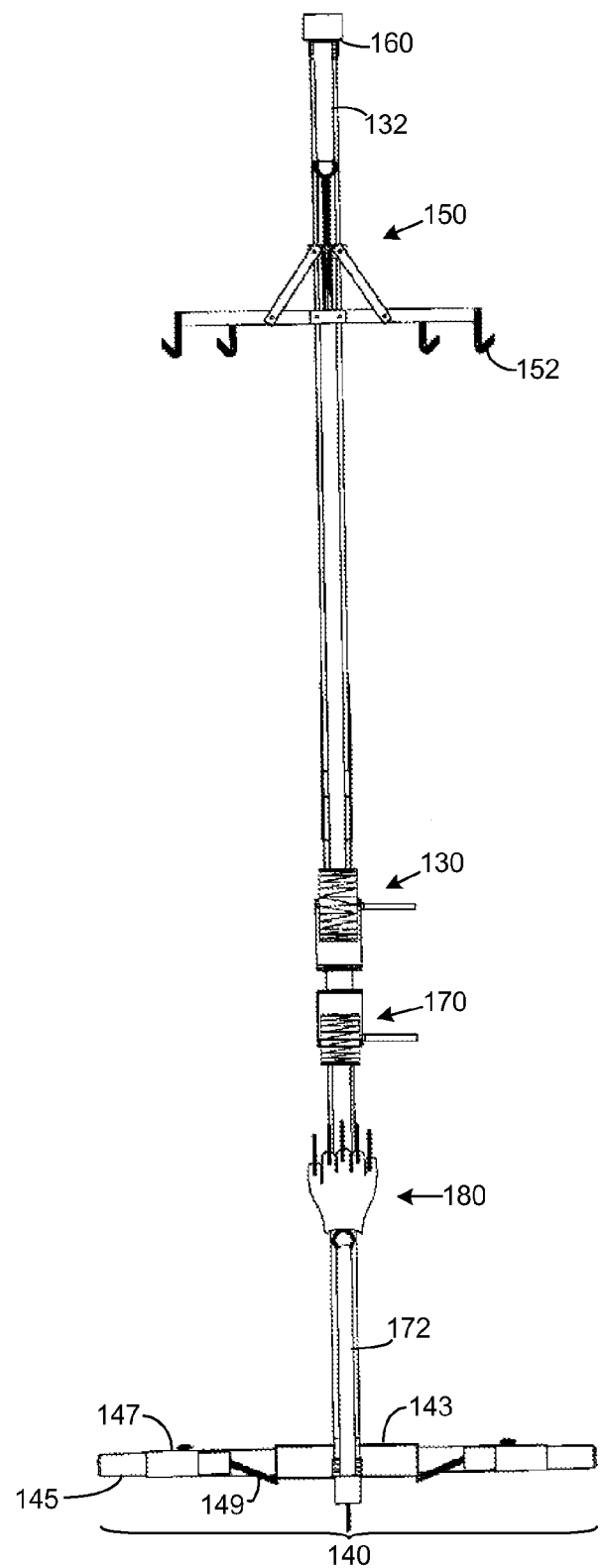
FIG. 3 is a front view of an exemplary game winch in accordance with one embodiment.

Referring to FIGS. 1-3, an exemplary embodiment of a game winch is shown. FIG. 1 is a perspective view of the game winch. FIG. 2 is a side view of the game winch (the view from the side of a vehicle on which the game winch is mounted). FIG. 3 is a front view of the game winch (the view from the rear of a vehicle on which the game winch is mounted).

The game winch is built around a vertical boom 110. The game winch has a hitch fitting 120 which allows the system to be mounted to a truck or other vehicle. A winch 130 is provided to allow a game animal to be raised to the top of the boom. A stabilizer 140 is provided to secure the lower legs of the game animal and thereby prevent swinging of the animal from the top of the boom.

Boom 110 consists of a lower portion 112 and an upper portion 114. The bottom end of lower portion 112 is welded to a hitch fitting 120. Hitch fitting 120 is a tubular steel member having a generally square cross-section which is designed to fit within a standard 2-inch hitch receiver. The hitch receiver is of the type that is commonly mounted under the rear bumpers of pickup trucks and other vehicles. Hitch fitting 120 has a hole therethrough which it is configured to accept a locking pin. The locking pin extends through both the hitch receiver and the hitch fitting in order to lock the fitting within the receiver.

Lower portion 112 of boom 110 extends vertically upward from hitch fitting 120. The lower end of upper portion 114 is pivotally connected to the upper end of lower portion 114. This allows upper portion 114 to be placed in several different positions, including a fully extended upright position as shown in FIGS. 1-3. Upper portion 114 may be pivoted roughly 180 degrees from the upright position to a stowed position 200 illustrated in FIG. 4. Upper portion 114 may also be placed in various intermediate positions, including a partially raised position 210 and a horizontal position 220 (also shown in FIG. 4). A pair of opposing plates (118, 119) are welded to lower portion 112 of boom 110 a pin 117 extends through plates 118 and 119 and the lower end of upper portion 114, thereby allowing upper portion 114 to pivot on lower portion 112. A removable pin is placed through appropriately positioned holes in upper portion 114 and plates 118, 119 to hold upper portion 114 in the desired position (e.g., upright, stowed, etc.).

Upper portion 114 of boom 110 includes a perpendicular member 116 which, when upper portion 114 is in the fully extended vertical position, extends horizontally outward from upper portion 114. A pair of pulleys (124, 126) are connected to perpendicular member 116. Pulleys 124 and 126 guide the strap 132 of first winch 130 along the length of upper portion 114 so that the winch can be used to raise a game animal to the top of the boom. The crank portion 134 of first winch 130 is positioned on lower portion 112 so that it can be conveniently operated by a person standing on the ground next to the system (which is mounted on a vehicle). For the purposes of this disclosure, the term "winch" may be used to refer to the entire winch system which includes the crank portion, the strap or cable which is wound around in the crank portion, and the pulleys which guide the strap/cable.

The end of strap 132 extends downward from perpendicular member 116. In this embodiment, a gambrel 150 is connected to the end of strap 132. Gambrel 150 has several hooks (e.g., 152) which are designed to pierce two of the legs of the game animal, thereby allowing the animal to be suspended from the gambrel. As first winch 130 is tightened, strap 132 is wound onto crank portion 134, raising gambrel 150 and the game animal to perpendicular member 116 of boom 110.

As noted above, stabilizer 140 is connected to the bottom of boom 110. Stabilizer 140 has two arms (141, 142) which extend horizontally outward from the lower end of boom 110. Each of arms 141 and 142 is generally L-shaped. In this embodiment, the main portion of each arm is constructed from square tubular steel. An attachment end of each arm is inserted into another square tubular section 143 which is connected to the lower end of boom 110. Each arm is secured within tubular section 143 by pins that extend through the tubular section and the arms, similar to the hitch fitting/receiver connection.

Opposite the attachment end of each of arms 141 and 142 is a stabilizer end. The stabilizer end has a tubular portion (e.g., 145) through which an adjustment portion (e.g., 147) extends. A pin (e.g., 149) is positioned at the end of the adjustment portion which faces the other stabilizer arm. The pin is designed to pierce one of the lower legs of the game animal which is suspended from gambrel 150. As winch 130 is tightened and the animal is raised, the pins of the stabilizer hold the animal in position so that it does not swing from the upper end of the boom. This stabilizes the animal and allows a single person to field dress the animal without having to have a second person hold and thereby stabilize the animal. The adjustment portion (e.g., 147) of each stabilizer arm (e.g., 141) is designed to slide within the tubular portion (e.g., 145) so that the pins of the stabilizer can be moved inward (toward each other) to stabilize smaller animals, or outward (away from each other) to stabilize larger animals. The adjustment portions of the stabilizer arms may include pins or other means to hold them in position within the tubular portions once they have been adjusted to their proper positions.

Figure 4:
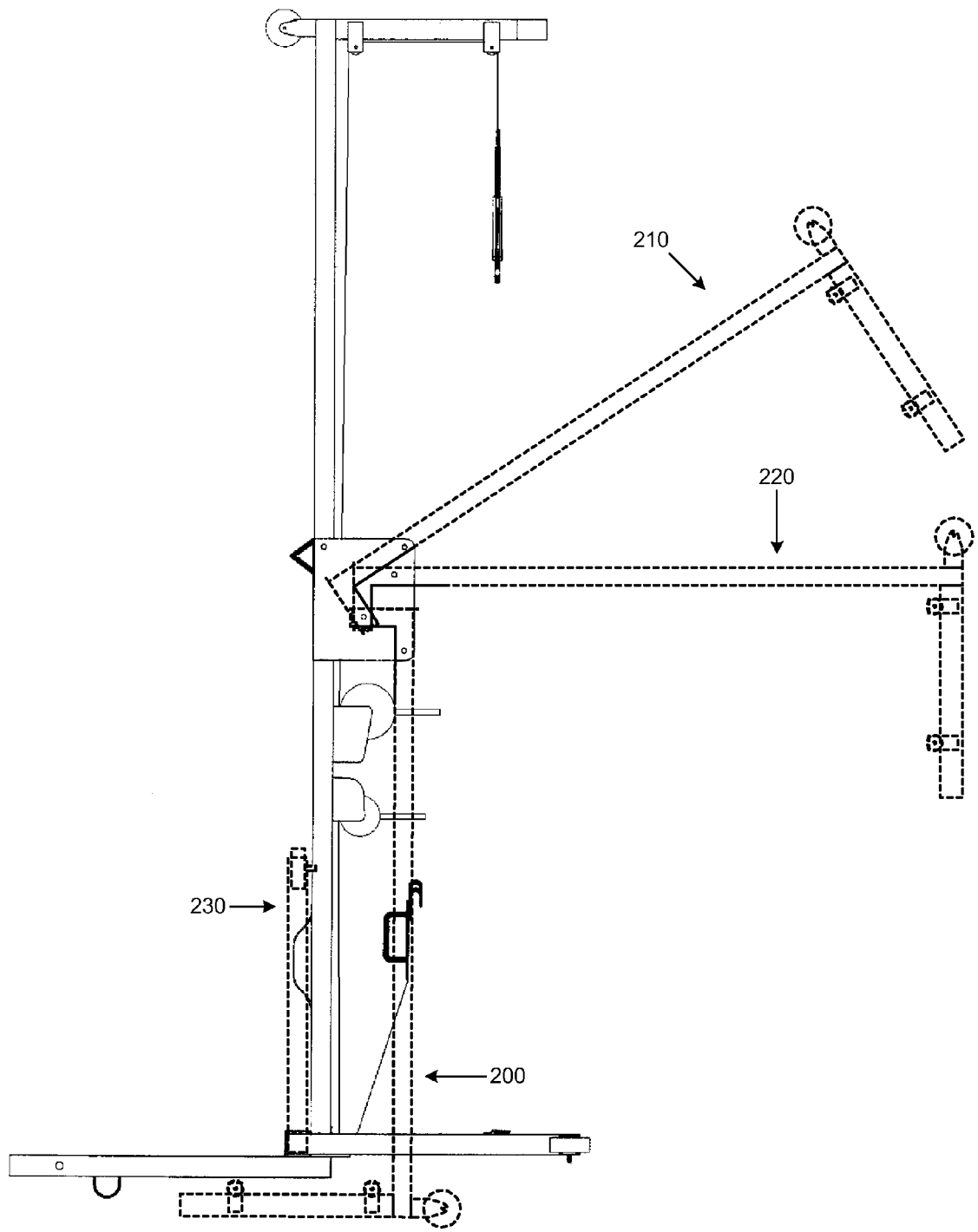
FIG. 4 is a side view of an exemplary game winch showing various positions of an upper portion of the boom.

Stabilizer arms 141 and 142 can be placed in either the horizontal position shown in FIGS. 1-3, or in a more compact upright position when the system is not in use. This upright position 230 is illustrated in FIG. 4. To move the stabilizer arms from one position to another, the pins that extend through stabilizer arms 141 and 142 and tubular section 143 are removed. Stabilizer arms 141 and 142 can then be removed from tubular section 143. Stabilizer arms 141 and 142 are then repositioned (e.g. moved from the horizontal position to a vertical position) and are re-inserted into tubular section 143. The locking pins are then re-inserted through stabilizer arms 141 and 142 and tubular section 143.

The embodiment depicted in FIGS. 1-3 includes a second winch 170 that is used to "skin" game animals (i.e., to remove the skin from the animals). Second winch 170 includes a crank portion 174, a strap 172 and a pulley 176. Strap 172 is wound around crank portion 174, with a portion extending downward and around pulley 176. The end of strap 172 is connected to a skinning attachment 180. The skinning attachment may also be referred to herein as a "skinning claw", because of the claw-like shape of the device.

With the game animal suspended from the top of boom 110, and typically after the animal has been field dressed, a lateral cut can be made at the upper end of the animal's body to begin separating the skin from the carcass. Once a flap of skin has been peeled away from the body, skinning attachment 180 can be secured to the flap of skin. This is done by inserting the hooks at the top of skinning attachment 180 into the flap of skin. Second winch 170 can then be tightened to pull skinning attachment 180 downward. As skinning attachment 180 moves downward, it pulls the skin from the animal's carcass. Because second winch 170 leverages the user's effort in cranking the winch, a great deal of downward force can be applied to skinning attachment 180, making the removal of the skin from the carcass very easy. The user can tighten second winch 170 with one hand, and can use a knife or similar tool with other hand to cut some of the connecting tissue between the skin and the carcass, facilitating removal of the skin.

The embodiment of FIGS. 1-3 includes a number of features that make the system easier to use. For example, the system includes a light 160 which is positioned at the end of perpendicular member 116. Light 160 is directed downward toward the area in which the game animal is suspended from the boom. Electrical wiring for light 160 extends through the boom and exits the boom near hitch fitting 120. At the pivoting connection between the upper and lower portions of the boom, the wiring passes through a protective conduit or sleeve to prevent the wires from being damaged. The wiring terminates in a connector which is designed to be coupled to a corresponding electrical connector of the type that is often installed with a hitch receiver to allow trailer lights to be connected to the vehicle's electrical system.

This embodiment also includes a wheel 162 which is positioned near the top of upper portion 114 of boom 110. We'll 162 is connected to the side upper portion 114 which faces in the same direction as hitch fitting 120. When boom 110 is folded into the stowed position, this places wheel 162 near the bottom of the system, facing away from hitch fitting 120. When the system is not installed on a vehicle, it can be transported by supporting the weight of the system on wheel 162, with hitch fitting 120 pointing generally upward. Wheel 162 also allows the system to be easily rolled into position to be installed, with hitch fitting 120 easily being maneuvered into position prior to being inserted into a hitch receiver.

This system also includes attachment points 164 and 166. When the system is mounted on a vehicle (with hitch fitting 120 inserted into a hitch receiver on the vehicle), stabilizing straps can be connected to attachment points 164 and 166. The other ends of the straps can be connected to tie downs on the vehicle, and the straps can be tightened to prevent the boom from tilting away from the vehicle. This prevents the system from rocking in the hitch receiver, and also increases the weight of the load that can be lifted by the system without damaging the hitch fitting or hitch receiver.

Figure 5A:
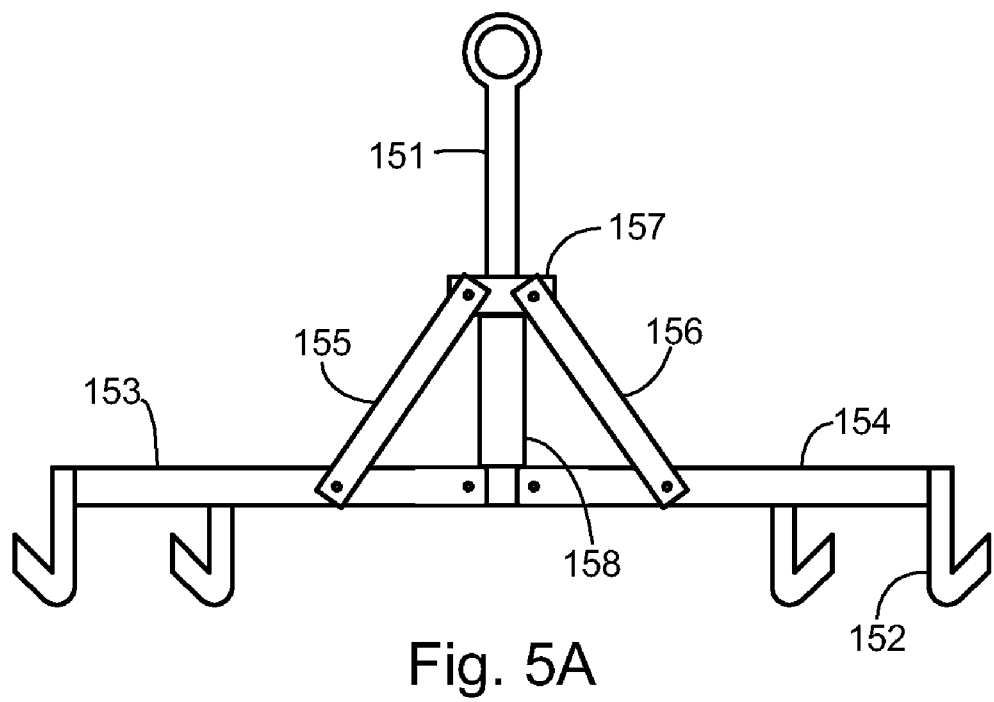
FIGS. 5A and 5B are diagrams illustrating an automatically spreading gambrel in accordance with one embodiment.
Figure 5B:
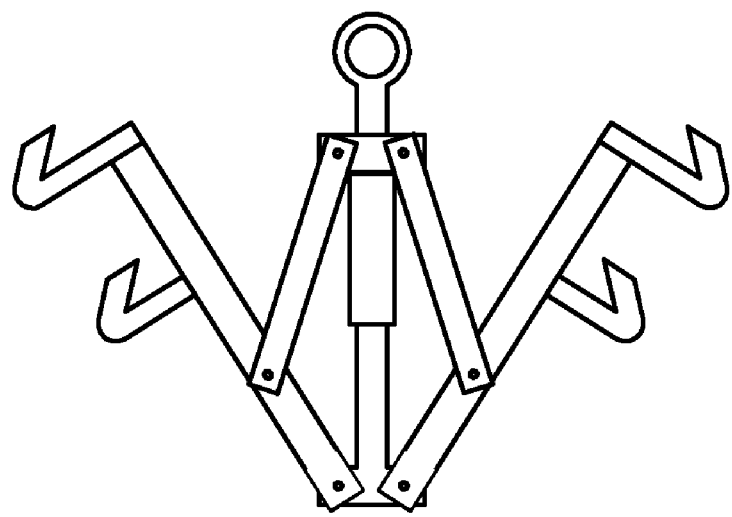

It should be noted that the system depicted in FIGS. 1-3 uses a novel gambrel 150. Gambrel 150 is illustrated in more detail in FIGS. 5A and 5B. FIG. 5A shows the gambrel in an extended position, while FIG. 5B shows the gambrel in a partially folded position. This gambrel includes a vertical member 151 and two lateral members 153 and 154 which pivot from the bottom of vertical member 151. The lateral members 153 and 154 are connected to a slide 157 by corresponding arms 155 and 156. This arrangement causes lateral members 153 and 154 to pivot at the same time and at the same angle. Additionally, this configuration allows the gambrel to be folded so that the hooks (e.g., 152) are near each other when they are placed through the legs of the animal, yet automatically spread the legs apart when the gambrel is raised and the animal's weight exerts a downward force on the hooks. It should be noted that FIG. 5B shows the gambrel in a partially folded position—when the gambrel is completely folded, lateral members 153 and 154 are parallel to vertical member 151. A tubular stop 158 is attached to the bottom of slide 157 to prevent lateral members 153 and 154 from falling below the horizontal position shown in FIG. 5A.

The skinning portion of the system is also novel. As noted above, second winch 170 is provided for the purpose of pulling skinning attachment 180 after it has been attached to the skin of the animal. In this embodiment, skinning attachment 180 consists of a central plate or body which has a loop on a lower end for attachment to the winch, and several hooks on the upper end for attachment to the animal's skin. A handle is provided on the back of skinning attachment 180 to allow the user to grasp the skinning attachment and position the hooks in the skin. Although the central plate shown in the figures is shaped like a hand or claw, the plate may have any suitable shape.

Alternative embodiments of the invention may have numerous variations from the embodiments described above. For example, the boom need not have a pivoting, two-part configuration which allows it to fold into various positions, but may instead utilize telescoping components, rigidly assembled components, or even one-piece construction. Further, the stabilizer need not be adjustable or stowable. Still further, the configurations of the gambrel and skinning attachment may be different than those shown in the figures. Still further, it should be noted that a number of the features described herein are optional, and many alternative embodiments omit one or more of these features.

While the present disclosure is directed primarily to the system set forth above, it should be noted that alternative embodiments include methods for use of this system, as well as various alternative configurations of the system.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system for suspending a game animal, the system comprising:

a hitch fitting configured to fit within a hitch receiver;

a boom coupled to the hitch fitting, wherein the boom extends upward from the hitch fitting;

a first winch coupled to an upper end of the boom, wherein the first winch is configured to raise and suspend a game animal from the upper end of the boom; and a stabilizer coupled to the lower end of the boom and configured to stabilize a lower end of the game animal which is suspended from the upper end of the boom, wherein the stabilizer is configured to secure the lower legs of the game animal, thereby preventing the game animal from swinging from the upper end of the boom.

2. The system of claim 1, wherein the system further comprises a light source coupled to the upper end of the boom, wherein the light source is configured to illuminate an area in which the game animal is suspended.

3. The system of claim 2, further comprising a connector configured to enable the light source to draw power from an electrical system of a vehicle on which the system is mounted.

4. The system of claim 1, wherein the boom comprises an upper portion and a lower portion, wherein the lower portion extends vertically upward from the hitch fitting, wherein the upper portion is pivotally connected to the lower portion and is configured to be alternately secured in multiple positions, the multiple positions including at least an upright position in which the upper portion extends substantially vertically from the lower portion and a stowed position in which the upper portion extends substantially vertically downward and parallel to the lower portion.

5. The system of claim 4, wherein multiple positions further include one or more intermediate positions in which the upper portion extends outward at an angle of between 90 and 135 degrees from the lower portion.

6. The system of claim 4, further comprising a wheel attached to the upper portion, wherein when the upper portion is in the stowed position, the wheel is positioned at the bottom of the system, wherein the wheel is configured to support the system and enable the system to be transported and maneuvered into position for mounting in the hitch receiver.

7. The system of claim 1, wherein the stabilizer is movably connected to the lower end of the boom, wherein the stabilizer can be placed alternately in a storage position in which the stabilizer is substantially parallel to the lower end of the boom, and a working position in which the stabilizer extends substantially perpendicular from the lower end of the boom.

8. The system of claim 1, wherein the stabilizer includes two opposing pins, each of which is configured to be placed through a corresponding leg of the game animal, thereby securing the lower end of the game animal.

9. The system of claim 8, wherein the stabilizer is adjustable to position the two pins at a variable distance from each other.

10. The system of claim 1, further comprising a second winch coupled to the lower end of the boom and a skinning attachment which is connected to the second winch, wherein when the skinning attachment is secured to the hide of the game animal, tightening the second winch pulls the skinning attachment downward, thereby pulling the hide from the game animal.

11. The system of claim 10, wherein the skinning attachment comprises a body portion having a plurality of hooks attached thereto, and a handle configured to enable a user to grasp the skinning attachment and fasten the hooks to the hide of the game animal.

12. The system of claim 1, further comprising a gambrel connected to the first winch, wherein the gambrel is configured to secure two of the legs of the game animal thereto, wherein when the first winch is tightened, the gambrel raises the game animal toward the upper end of the boom.

13. The system of claim 12, wherein the gambrel comprises a vertical member, wherein an upper end of the vertical member is configured to be connected to the first winch, the gambrel further comprising two lateral members, each of which is pivotally connected to a lower end of the vertical member, wherein when each of the lateral members has a corresponding leg of the game animal secured thereto, the weight of the game animal causes the lateral members and the legs of the game animal to move outward from the vertical member.

14. The system of claim 1, further comprising an attachment point on the boom, wherein the attachment point is configured to have one or more stabilizing lines attached thereto, thereby securing the boom.

15. A method for suspending a game animal for field dressing, the method comprising:

providing an apparatus having:
    a hitch fitting configured to fit within a hitch receiver;
    a boom coupled to the hitch fitting, wherein the boom extends upward from the hitch fitting;
    a first winch coupled to an upper end of the boom, wherein the first winch is configured to raise and suspend a game animal from the upper end of the boom; and
    a stabilizer coupled to the lower end of the boom and configured to stabilize a lower end of the game animal which is suspended from the upper end of the boom,
securing an upper end of the game animal to the first winch;
raising the upper end of the game animal with the first winch; and
securing each of the lower legs of the game animal to the stabilizer, thereby preventing the game animal from swinging.

16. The method of claim 15, wherein the system includes a second winch coupled to the lower end of the boom and a skinning attachment which is connected to the second winch, wherein the method further comprises securing the skinning attachment to the hide of the game animal, tightening the second winch, thereby pulling the skinning attachment downward and pulling the hide from the game animal.

17. The method of claim 15, further comprising field dressing the animal while the lower legs of the game animal are secured to the stabilizer.

18. A system for suspending a game animal, the system comprising:
    a hitch fitting configured to fit within a hitch receiver;
    a boom coupled to the hitch fitting, wherein the boom extends upward from the hitch fitting;
    a first winch coupled to an upper end of the boom, wherein the first winch is configured to raise and suspend a game animal from the upper end of the boom; and
    a stabilizer coupled to the lower end of the boom and configured to stabilize a lower end of the game animal which is suspended from the upper end of the boom, wherein the stabilizer includes two opposing pins, each of which is configured to be placed through a corresponding leg of the game animal, thereby securing the lower end of the game animal, wherein the stabilizer is adjustable to position the two pins at a variable distance from each other.

* * * * *